Patented Jan. 27, 1942

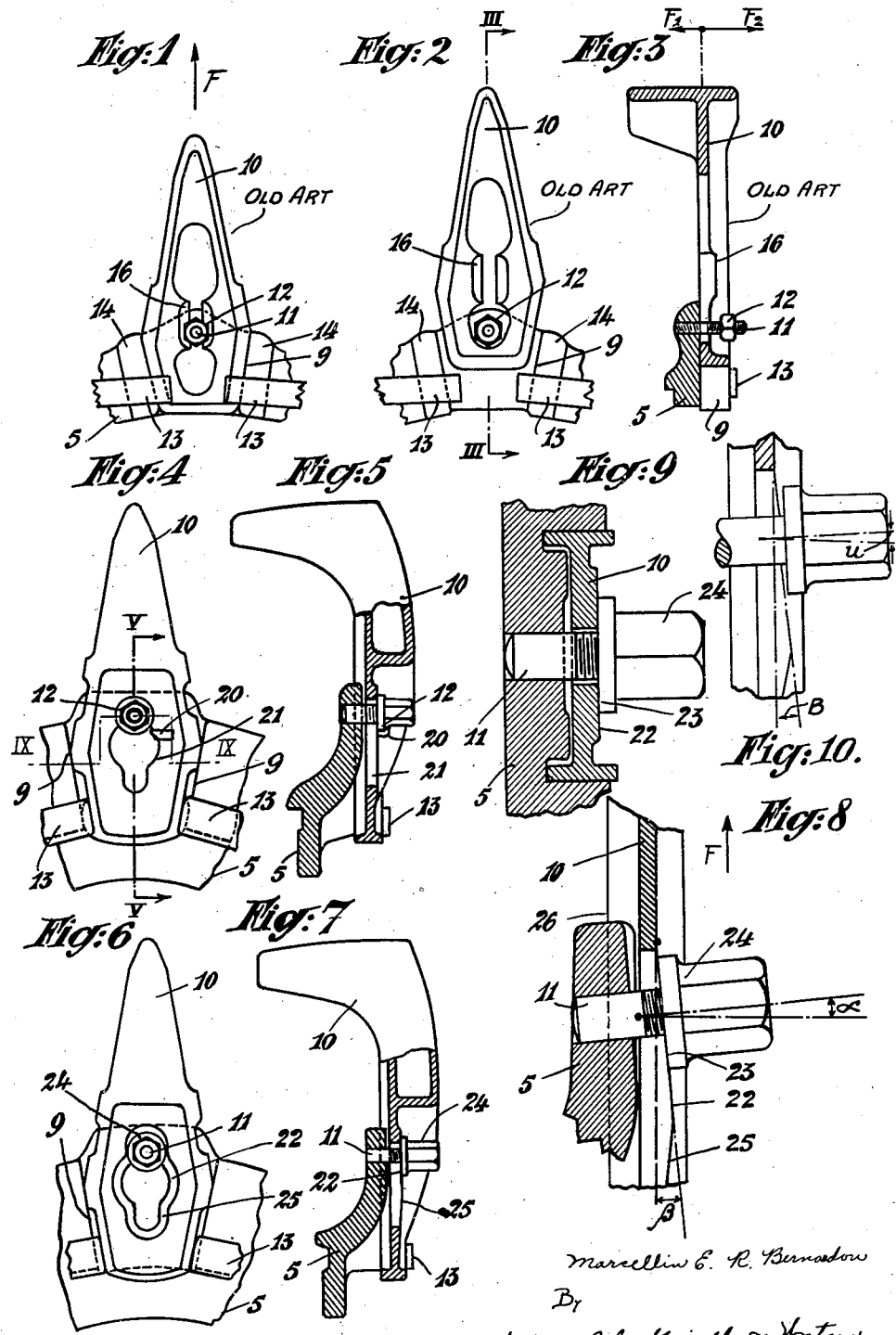

2,271,360

UNITED STATES PATENT OFFICE 2,271,360

TRACTOR OR OTHER VEHICLE WHEEL

Marcellin Eugène René Bernardon, Paris, France, assignor to Societe Anonyme des Pneumatiques Dunlop, Paris, France, a company of France Application January 23, 1939, Serial No. 252,458
In France February 18, 1938

5 Claims. (Cl. 301—50)

In my prior U. S. patent application Ser. No. 172,479, filed Nov. 2, 1937, now Patent No. 2,191,950, of which the present application is a continuation-in-part, I have described improvements in vehicle wheels, and especially tractor wheels, for obtaining a better adhesion of the wheel on the ground. These improvements include, in particular, the provision, on the wheel, of an annular part or auxiliary support intended to receive removable blades capable of occupying either of two different positions, according as they are to work or to remain inoperative. In particular, in this prior patent application, I described blades made in the form of wedges adapted to engage in corresponding housings of the annular member or support, the sides of said housings converging in the direction of the center of the wheel.

Blades made according to the system above referred to have proved to be wholly satisfactory for practical purposes. However, I have found that it is possible, through very simple means, to make them capable of resisting detrimental displacements which tend to move them out from their housings.

The object of the present invention is to provide a wheel of the type above described which is better adapted to meet the requirements of practice than wheels of the same type made up to the present time.

According to the essential feature of the present invention, I provide a wheel of the type above described with means for opposing a radial displacement of the blades, at least when said blades are in the active position.

According to an embodiment of the present invention, the above mentioned means include elements carried by said support and said blades, respectively, adapted to coact by bearing against one another, one of these elements being a part existing, for instance, normally on the support. In particular, one of the elements may be a projection or lug carried by each blade, whereas the other is a part of the wheel, such for instance as the nut or stud which serves to connect the blade with its support.

According to another embodiment of the present invention, or in combination with the above mentioned arrangement, a blade and its support (in particular the nut of the holding stud fixed on the support proper) are provided with inclined surfaces intended to come in contact with one another and to produce a wedging which prevents any tendency to the displacement which is to be avoided.

Another feature of the present invention concerns the particular structure of the blades of the wheel.

Other features of the present invention will result from the following detailed description of some specific embodiments thereof.

Preferred embodiments of the present invention will be hereinafter described, with reference to the accompanying drawing, given merely by way of example, and in which:

Fig. 1 is a front view of a wheel blade made according to the prior patent application above referred to;

Fig. 2 is a view, similar to Fig. 1, showing the blade in a different position;

Fig. 3 is a sectional view on the line III—III of Fig. 2;

Fig. 4 is a front view showing, in the same manner as Fig. 1, a blade made according to the present invention;

Fig. 5 is a part sectional view on the line V—V of Fig. 4;

Fig. 6 is a front view of a blade made according to another embodiment of the invention;

Fig. 7 is a sectional view corresponding to Fig. 6;

Fig. 8 shows, on an enlarged scale, a detail of Fig. 7;

Fig. 9 is a sectional view on the line IX—IX of Fig. 4; and

Fig. 10 is a fragmentary sectional view similar to that shown in Fig. 8, but illustrating a further embodiment of the invention.

As shown by the drawing, an annular member 5 carried by the wheel is provided with recesses, housings or grooves having convergent sides 9 so as to receive blades 10. Along the axial line of these housings I provide studs 11 rigid with annular member 5 and adapted to receive the tightening nuts 12 of the blades.

Furthermore, small plates 13 are fixed in any suitable manner to the bosses 14 which separate said housings or recesses from one another and in the part thereof that is nearer to the center of the wheel. These small plates 13, which project slightly from the sides 9 of the housings, are intended to reduce the stress supported by studs 11, and also to prevent the lateral pivoting of the blades in the eventuality of nuts 12 being loosened.

Experience has taught that, with an arrangement of the kind of that disclosed by Fig. 1, efforts occur, when the blades are in service, which tend to move each blade 10 in the direction of arrow F. In particular, when the vehicle is running on sticky ground, earth is forced between the pneumatic tire and the blade and, furthermore, when the blade is pulled out from the ground, a suction is produced. As a consequence, efforts are produced a component of which is in the direction of arrow F. If the tightening of screw 12 is insufficient, the blade finally escapes from plates 13, which permits it to swing. It can even escape to nut 12, as shown by Figs. 2 and 3, and it is then free to oscillate laterally (direction of arrows F₁ and F₂) and it can be detached from the wheel.

According to the present invention, in the embodiment of Figs. 4 and 5, such a displacement of blade 10 is made impossible by providing a boss, lug or projection 20 on the blade (this part being for instance cast integral with said blade or fixed thereto) which is stopped by nut 12 when the blade tends to move outwardly from its housing.

In the embodiment shown by Figs. 6 to 8, blade 10 is provided with an inclined surface 22 and stud 11 is fixed obliquely in annular member 5, in such manner as to be at right angles to surface 22, whereby the bearing surface of nut 24 is correctly applied upon this surface 22; it will be readily understood that, with such an arrangement, any tendency to displacement of blade 10 in the direction of arrow F produces a wedging of this blade between the annular member 5 and the nut. I may provide on the blade a second inclined surface 25 for obtaining the same result as above set forth when the blade is in inoperative position.

It has been supposed that nut 12 is carried by a stud 11 perpendicular to surface 22, that is to say that the inclination β of surface 22 with respect to the bearing surface of the blade on support 5 was equal to the angle α made by the axis of stud 11 with a line perpendicular to this bearing surface. I may advantageously take angle β greater than angle α, which ensures a better wedging, together with a locking of the nut on the stud as illustrated in Figure 10.

In Figs. 4 to 8, I have shown blades a little different from those disclosed by the prior application above referred to, especially concerning the shape of their pointed end and by the fact that instead of being of U-shaped section, they are of I-shaped section; this last mentioned feature (see in particular Fig. 9) is interesting in that blade 10 bears upon support 5 merely through the edges 26 of its wings; the web can therefore yield slightly and the elasticity of the metal, especially if the blade is made of steel, ensures an elastic pressure on nut 24 thus opposing its loosening.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A vehicle wheel with peripheral ground gripping blades, comprising a concentrical annular member for supporting such blades in radial recesses made along its periphery, these recesses having two inwardly converging side walls, a threaded stud rigidly projecting between these side walls, said blades each constituted by two opposed wedge-like portions, one being substantially triangular and the other truncated, forming laterally inclined edges adapted to be engaged with said side walls, a nut on each stud, each blade having an elongated centrally enlarged slot adapted to ride on said stud so as to enable the blade to be either rigidly fixed in its recess by means of said nut when screwed down on said stud and by means of the wedging action between said side walls and respective laterally inclined edges of the blade with its triangular wedge-like portion projecting outwardly from the wheel in its operative position, or to be reversed and set into its inoperative position with the said triangular wedge-like portion turned inwardly.

2. A vehicle wheel with peripheral ground gripping blades, comprising a concentrical annular member for supporting such blades in radial recesses made along its periphery, these recesses having two inwardly converging side walls, a threaded stud rigidly projecting between these side walls, projections on said annular member extending beyond said respective side walls and partly overlapping said recesses, said blades each constituted by two opposed wedge-like portions, one being substantially triangular and the other truncated, forming laterally inclined edges adapted to be engaged with said side walls, a nut on each stud each blade having an elongated centrally enlarged slot adapted to ride on said stud so as to enable the blade to be either rigidly fixed in its recess by means of said nut when screwed down on said stud by means of the wedging action between said side walls and respective laterally inclined edges of the blade and under the action of said overlapping projections upon respective laterally inclined edges of the blade with its triangular wedge-like portion projecting outwardly from the wheel in its operative position, or to be reversed and set into its inoperative position with the said triangular wedge-like portion turned inwardly.

3. A vehicle wheel with peripheral ground gripping blades, comprising a concentrical annular member for supporting such blades in radial recesses made along its periphery, said recesses having two inwardly converging side walls, a threaded stud obliquely projecting from, and rigid with the recess between its side walls, projections on said annular member extending beyond said respective side walls and partly overlapping said recesses, said blades each constituted by two opposed wedge-like portions, one being substantially triangular and the other truncated, forming laterally inclined edges adapted to be engaged with said side walls, a nut on each stud each blade having an elongated centrally enlarged slot and adjacent thereto an inclined area, said slot being adapted to ride on said stud so as to enable the blade to be either rigidly fixed in its recess by means of said nut when screwed down on said stud by means of the wedging action between said side walls and respective laterally inclined edges of the blade and by means of the double action of said overlapping projections upon respective blade inclined edges and of the said nut upon said inclined area of the blade in full contact with the nut base, the blade having its triangular wedge-like portion projecting outwardly from the wheel in its operative position, or to be reversed and set into its inoperative position with its triangular wedge-like portion turned inwardly.

4. A vehicle wheel with peripheral ground gripping blades, comprising a concentrical annular member for supporting such blades in radial recesses made along its periphery, said recesses having two inwardly converging side walls, a threaded stud obliquely projecting from, and rigid with the recess between said side walls, projections on said annular member extending beyond said respective side walls and partly overlapping said recesses, said blades each constituted by two opposed wedge-like portions, one being substantially triangular and the other truncated, forming laterally inclined edges adapted to be engaged with said side walls, a nut on each stud each blade having an elongated centrally enlarged slot and adjacent thereto an inclined area, said slot being adapted to ride on said stud so as to enable the blade to be either rigidly fixed in its recess, with its triangular wedge-like portion projecting outwardy from the wheel in its operative position, by means of said nut when screwed down in said stud by means of the wedging action between said side walls and respective laterally inclined edges of the blade and by means of the double action of said overlapping projections upon respective blade laterally inclined edges and of the said nut upon the said blade inclined area being bitingly gripped by a portion of the nut base, or to be reversed and set into its inoperative position with the said triangular wedge-like portion turned inwardly.

5. A vehicle wheel with peripheral ground gripping blades, comprising a concentrical annular member for supporting such blades in radial recesses made along its periphery, these recesses having two inwardly converging side walls, a threaded stud rigidly projecting between these side walls, said blades constituted each by two opposed wedge-like portions, one substantially triangular and the other truncated, forming laterally inclined edges adapted to be engaged with said side walls, a nut on each stud each blade being of I-shaped cross-section, with its outer flanges adapted to rest against the recess bottom and its web to span the recess between its side walls and the blade having an elongated centrally enlarged slot adapted to ride on said stud so as to enable the blade to be either rigidly fixed in its recess, with its triangular wedge-like portion projecting outwardly from the wheel in its operative position, by means of said nut when screwed down on said stud by means of the wedging action between said side walls and respective laterally inclined edges of the blade and by means of the action of said nut upon the blade web being resiliently compressed thereby, or to be reversed and set into its inoperative position with its triangular wedge-like portion turned inwardly.

MARCELLIN EUGÈNE RENÉ BERNARDON.